US008226873B1

(12) United States Patent
Martin et al.

(10) Patent No.: US 8,226,873 B1
(45) Date of Patent: Jul. 24, 2012

(54) METHOD FOR DESIGNING AND MAKING A PLURAL-LAYER COMPOSITE ARMOR SYSTEM

(75) Inventors: Curtis A. Martin, Damascus, MD (US); David E. Johnson, Glen Burnie, MD (US); David P. Owen, Columbia, MD (US); Rodney O. Peterson, Frederick, MD (US); Philip J. Dudt, North Bethesda, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 13/362,856

(22) Filed: Jan. 31, 2012

Related U.S. Application Data (62) Division of application No. 11/973,999, filed on Oct. 5, 2007, now Pat. No. 8,105,510.

(51) Int. Cl.
*B29C 39/18* (2006.01)
*F41H 5/04* (2006.01)

(52) U.S. Cl. ......... 264/261; 264/275; 89/36.02; 89/906; 89/908; 89/918; 703/6

(58) Field of Classification Search .................. None
See application file for complete search history.

(56) References Cited

U.S. PATENT DOCUMENTS

| | | | | |
|---|---|---|---|---|
| 4,061,815 A | * | 12/1977 | Poole, Jr. ...................... | 428/215 |
| 4,404,889 A | * | 9/1983 | Miguel ......................... | 89/36.02 |
| 4,529,640 A | * | 7/1985 | Brown et al. .................. | 428/116 |
| 4,665,794 A | * | 5/1987 | Gerber et al. ................. | 89/36.02 |
| 4,732,803 A | * | 3/1988 | Smith, Jr. ...................... | 428/212 |
| 4,738,893 A | * | 4/1988 | Grillo ........................... | 442/246 |
| 5,059,467 A | * | 10/1991 | Berkovitz ..................... | 428/137 |
| 5,221,807 A | * | 6/1993 | Vives ............................ | 89/36.02 |
| 5,271,612 A | * | 12/1993 | Yada et al. .................... | 267/158 |
| 5,456,156 A | * | 10/1995 | Semple ......................... | 89/36.02 |
| 5,635,288 A | * | 6/1997 | Park .............................. | 428/105 |
| 5,635,562 A | * | 6/1997 | Malcolm ....................... | 525/108 |
| 5,705,764 A | * | 1/1998 | Schade et al. ................ | 89/36.02 |
| 5,789,327 A | * | 8/1998 | Rousseau ...................... | 442/135 |
| 5,792,974 A | * | 8/1998 | Daqis et al. .................. | 89/36.02 |
| 6,009,789 A | * | 1/2000 | Lyons .......................... | 89/36.02 |
| 6,213,540 B1 | * | 4/2001 | Tusim et al. ............. | 296/187.02 |
| 6,228,933 B1 | * | 5/2001 | Hiles ............................ | 524/590 |
| 6,253,655 B1 | * | 7/2001 | Lyons et al. ................. | 89/36.02 |
| 6,298,963 B1 | * | 10/2001 | Kim .............................. | 188/379 |
| 6,332,390 B1 | * | 12/2001 | Lyons .......................... | 89/36.02 |
| 6,386,131 B1 | * | 5/2002 | Barsoum ..................... | 114/65 R |

(Continued)

*Primary Examiner* — Edmund H. Lee
(74) *Attorney, Agent, or Firm* — Howard Kaiser (57) ABSTRACT

The present invention's stratified composite system of armor, as typically embodied, comprises a backing stratum and a strike stratum that includes elastomeric matrix material and low-density ceramic elements embedded therein and arranged (e.g., in one or more rows and one or more columns) along a geometric plane (or plural parallel geometric planes) corresponding to the front surface of the strike stratum. Some inventive embodiments also comprise a spall-containment stratum fronting the strike stratum. The density of the low-density ceramic material is in the approximate range 2.0-3.0 g/cm³. In the strike stratum, the volume ratio of the low-density ceramic material to the elastomeric matrix material is in the approximate range 4-20. The present invention's emulative method for designing an inventive armor system typically involves configurative change of the inventive armor system's low-density ceramic material vis-à-vis another armor system's high-density ceramic material so that the respective ceramic material areal densities are equal.

20 Claims, 9 Drawing Sheets

U.S. PATENT DOCUMENTS

| | | | |
|---|---|---|---|
| 6,510,777 B2 * | 1/2003 | Neal | 89/36.05 |
| 6,532,857 B1 * | 3/2003 | Shih et al. | 89/36.02 |
| 6,601,497 B2 * | 8/2003 | Ghiorse et al. | 89/36.02 |
| 6,792,843 B2 * | 9/2004 | Mohr et al. | 89/36.02 |
| 6,860,186 B2 * | 3/2005 | Cohen | 89/36.02 |
| 7,067,031 B2 * | 6/2006 | deWitt | 156/250 |
| 7,114,764 B1 * | 10/2006 | Barsoum et al. | 296/193.07 |
| 7,261,945 B2 * | 8/2007 | Biermann et al. | 428/469 |
| 7,300,893 B2 * | 11/2007 | Barsoum et al. | 442/134 |
| 7,383,762 B2 * | 6/2008 | Cohen | 89/36.02 |
| 7,413,809 B2 * | 8/2008 | Biermann et al. | 428/469 |
| 7,685,922 B1 * | 3/2010 | Martin et al. | 89/36.02 |
| 7,794,808 B2 * | 9/2010 | Dudt et al. | 428/36.9 |
| 7,833,627 B1 * | 11/2010 | Ferrando | 428/416 |
| 2002/0178900 A1 * | 12/2002 | Ghiorse et al. | 89/36.02 |
| 2007/0089596 A1 * | 4/2007 | Huber et al. | 89/36.02 |
| 2007/0111621 A1 * | 5/2007 | Barsoum et al. | 442/135 |
| 2011/0036234 A1 * | 2/2011 | Fisher | 89/36.02 |
| 2011/0083549 A1 * | 4/2011 | Ravid et al. | 89/36.02 |

\* cited by examiner

METHOD FOR DESIGNING AND MAKING A PLURAL-LAYER COMPOSITE ARMOR SYSTEM

CROSS-REFERENCE TO RELATED APPLICATIONS

This application is a divisional of U.S. nonprovisional patent application Ser. No. 11/973,999, filing date 5 Oct. 2007, now U.S. Pat. No. 8,105,510 B1, issue date 31 Jan. 2012, hereby incorporated herein by reference, entitled "Method for Making Ballistic Armor Using Low-Density Ceramic Material," joint inventors Curtis A. Martin, David E. Johnson, David P. Owen, Rodney O. Perterson, and Philip J. Dudt.

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

The present invention relates to armor methodologies that implement ceramic material, more particularly to armor methodologies that implement discrete ceramic elements in combination with non-ceramic material.

Current military armor applications include land vehicles, air vehicles (e.g., aircraft and rotorcraft), stationary structures, and personnel. Other applications of armor systems are less common but may become more prevalent in the future, including marine vehicles (e.g., ships), unmanned air vehicles, unmanned marine vehicles, and missiles. Generally, the weight of an armor system is most critical for personnel/personal (e.g., helmet or body) armor.

Various armor constructions and configurations have been disclosed involving utilization of ceramic material. Shih et al. U.S. Pat. No. 6,532,857 B1 issued 18 Mar. 2003 entitled "Ceramic Array Armor," incorporated herein by reference, disclose an armor system that includes an elastomeric matrix material and, encapsulated therein, plural ceramic tiles arrayed along a common surface and spaced apart from one another. See also the following U.S. patents, each of which is incorporated herein by reference: deWitt, U.S. Pat. No. 7,067,031 B2, issued 27 Jun. 2006, entitled "Process for Making A Ceramic Armor Plate"; Cohen, U.S. Pat. No. 6,860,186 B2, issued 1 Mar. 2005, entitled "Ceramic Bodies and Ballistic Armor Incorporating the Same"; Mohr et al., U.S. Pat. No. 6,792,843 B2, issued 21 Sep. 2004, entitled "Armor-Plating Composite"; Ghiorse et al., U.S. Pat. No. 6,601,497 B2, issued 5 Aug. 2003, entitled "Armor with In-Plane Confinement of Ceramic Tiles"; Lyons, U.S. Pat. No. 6,332,390 B1, issued 25 Dec. 2001, entitled "Ceramic Tile Armor with Enhanced Joint and Edge Protection"; Lyons et al., U.S. Pat. No. 6,253,655 B1, issued 3 Jul. 2001, entitled "Lightweight Armor with a Durable Spall Cover"; Lyons, U.S. Pat. No. 6,009,789, issued 4 Jan. 2000, entitled "Ceramic Tile Armor with Enhanced Joint and Edge Protection."

Certain ceramic materials are known in the art to be suitable for use in armor applications. These conventional armor ceramics—which include aluminum oxide (commonly called "alumina"), silicon carbide, boron carbide, and titanium carbide—have been developed over the last thirty years or so, and represent the current state of the art. These conventional pure ceramic materials have been relied upon in conventional practice of armor systems, for instance for protection against impact by a projectile such as a ballistic body (e.g., small arms fire) or an explosive fragment (e.g., shrapnel from a bomb blast).

Although conventional ceramic armor materials often perform satisfactorily, they (and therefore armor systems implementing them) tend to be expensive to produce. The need exists in the armor-related arts for materials and systems affording lower production costs and higher production capacities.

SUMMARY OF THE INVENTION

In view of the foregoing, it is an object of the present invention to provide a new armor system that affords lower cost but equivalent performance as compared with conventional armor systems.

The present invention provides a unique methodology for implementing low-density ceramic material in armor applications. The desirability of using low-density ceramic material is associated with the desirability of using low-cost ceramic material. The present inventors were motivated by the fact that aluminosilicate porcelain, a low-density ceramic material, is considerably more economical than conventional ceramic armor materials such as aluminum oxide, silicon carbide, boron carbide, and titanium carbide. Manufacture of aluminosilicate porcelain and articles made thereof is relatively inexpensive. Moreover, the low-density nature of a ceramic material, in and of itself, can be advantageous; in general, lighter-weight materials are easier to work with in manufacture and transport.

The term "low-density ceramic material," as used herein, denotes a ceramic material characterized by a density less than or equal to approximately three grams per cubic centimeter. The term "high-density ceramic material," as used herein, denotes a ceramic material characterized by a density greater than approximately three grams per cubic centimeter. Most inventive embodiments implement low-density ceramic material having a density greater than or equal to approximately two grams per cubic centimeter. That is, according to typical inventive practice, the density of the low-density ceramic material is in the range between approximately two grams per cubic centimeter and approximately three grams per cubic centimeter.

As typically embodied, the present invention's plural-layer composite armor system comprises a ceramic-material-embedded elastomeric matrix material layer and a rigid backing layer. The ceramic-material-embedded elastomeric matrix material layer includes an elastomeric matrix material and plural low-density ceramic elements embedded in the elastomeric matrix material. Each low-density ceramic element is composed of ceramic material characterized by a density in the approximate range between two grams per cubic centimeter and three grams per cubic centimeter. The low-density ceramic elements are arrayed along at least one geometric plane corresponding to the ceramic-material-embedded elastomeric matrix material layer. The volume ratio of the low-density ceramic elements to the elastomeric matrix material is in the approximate range between four and twenty.

The present invention also provides a method for designing an inventive composite armor system, which typically includes determining and recording (e.g., on paper or electronically) configurative change of the inventive composite armor system's low-density ceramic material vis-à-vis a reference composite armor system's high-density ceramic material so that the respective ceramic material areal densities are equal. For instance, where the reference composite armor system's high-density ceramic elements each have a rectangular parallelepiped shape and are arrayed in a particular areal pattern, an inventive composite armor system affording comparable ballistic-resistant attributes can be inventively designed so that its low-density ceramic elements are arrayed in a congruent areal pattern (with equal in-plane sizes and shapes of, and equal in-plane relative positioning between, the ceramic elements), but each have a more voluminous rectangular parallelpiped shape—having greater through-plane thicknesses as compared with the high-density ceramic elements.

Other objects, advantages and features of the present invention will become apparent from the following detailed description of the present invention when considered in conjunction with the accompanying drawings.

BRIEF DESCRIPTION OF THE DRAWINGS

The present invention will now be described, by way of example, with reference to the accompanying drawings, wherein like numbers indicate same or similar parts or components, and wherein:

FIG. 7 depicts normalized $V_{50}$ for the four different experimental armor systems, which were characterized by equal areal densities. The four different experimental armor systems are depicted in FIG. 1 (the first experimental armor system, which included a single-plane array of aluminosilicate porcelain elements), FIG. 2 (the second experimental armor system, which included a double-plane array of aluminosilicate porcelain elements), FIG. 3 (the third experimental armor system, which included a single-plane array of 90% aluminum oxide elements), and FIG. 4 (the fourth experimental armor system, which included a single-plane array of 99% aluminum oxide elements).

DETAILED DESCRIPTION OF THE INVENTION

Figure 3:
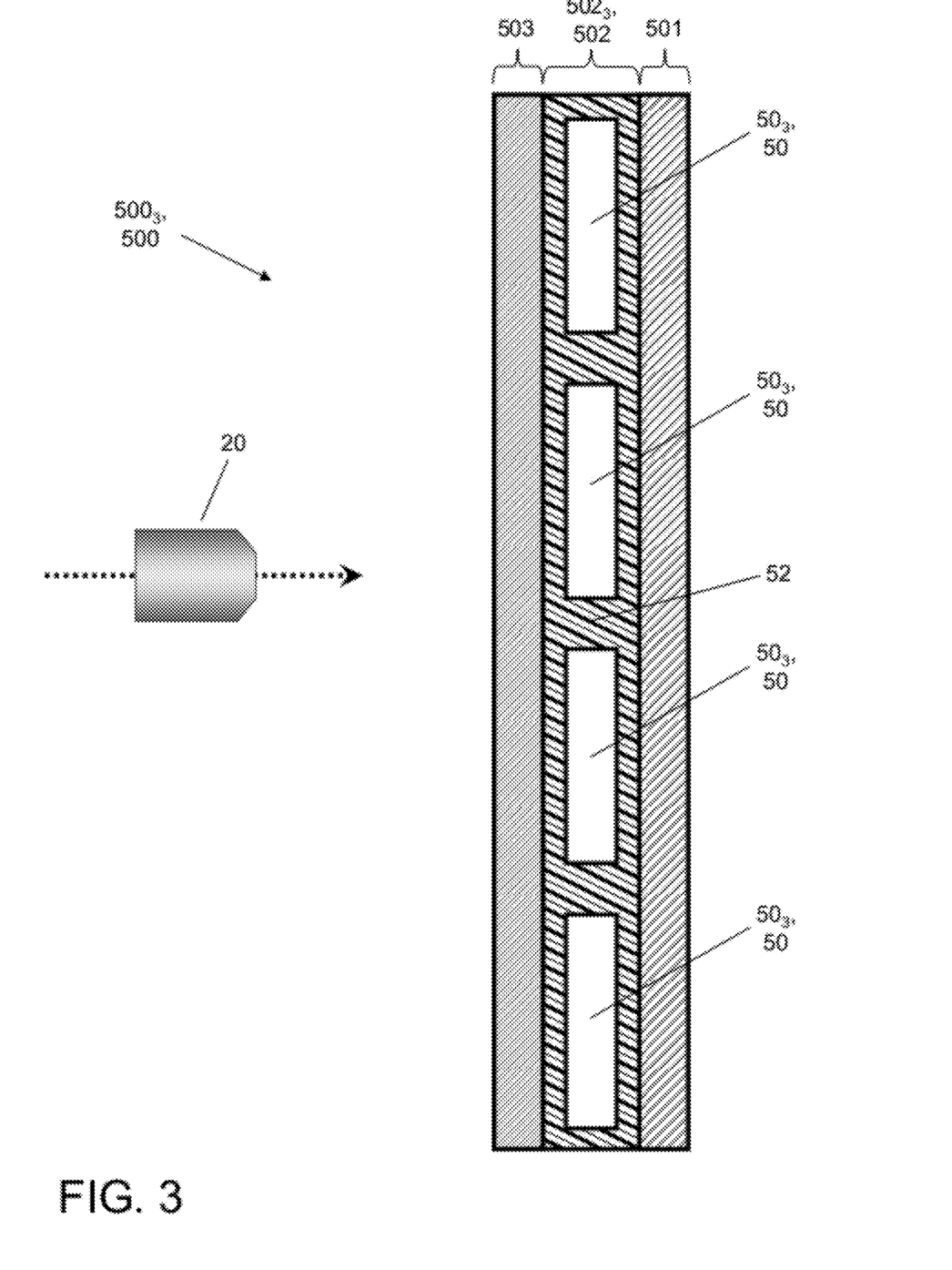
FIG. 3 and FIG. 4 are each a side cross-sectional view of a three-layer ballistic armor system that includes ceramic elements made of a conventional ceramic material. The conventional ceramic material of FIG. 3 is 90% aluminum oxide. The conventional ceramic material of FIG. 4 is 99% aluminum oxide.
Figure 4:
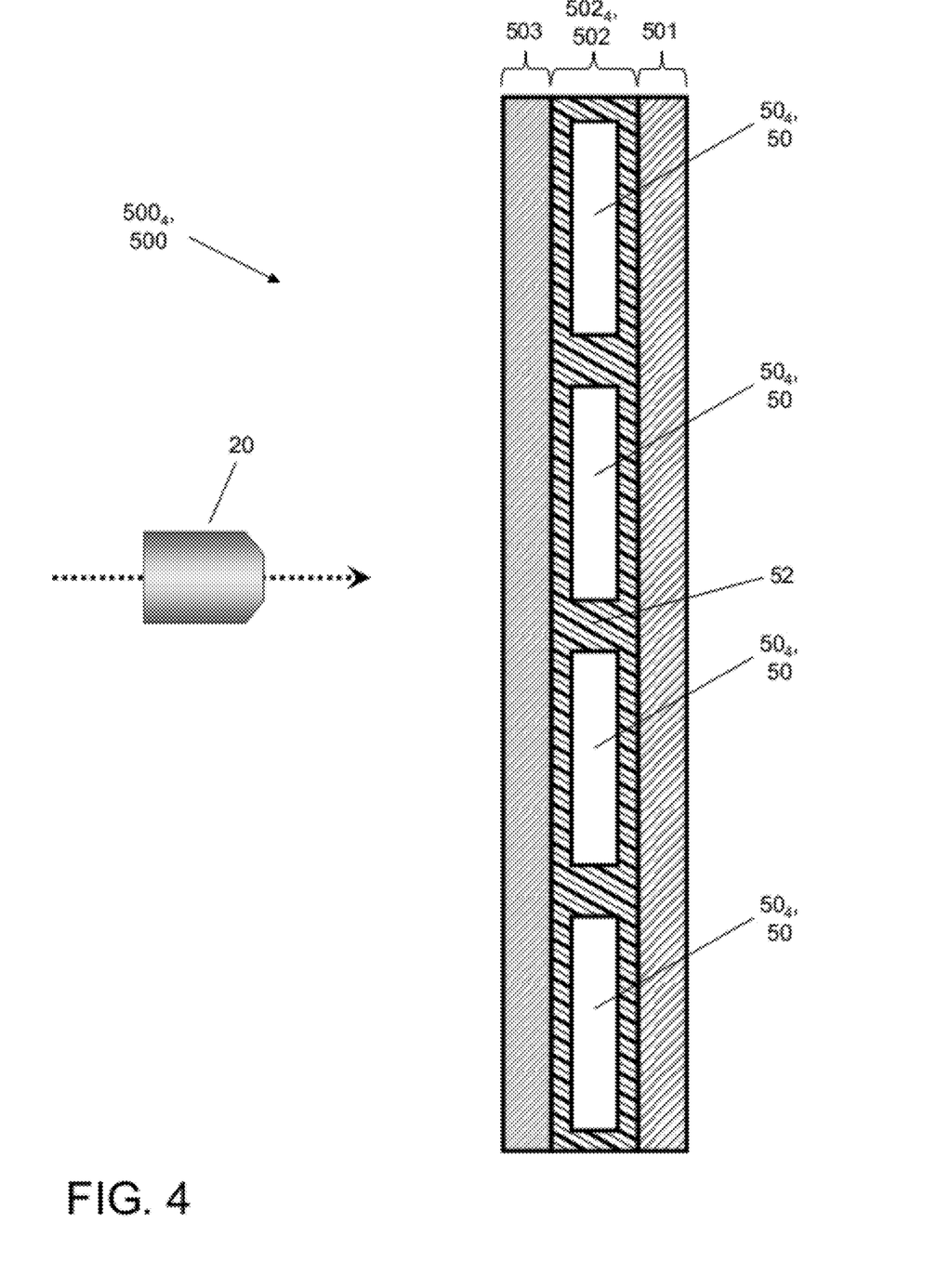
Figure 5:
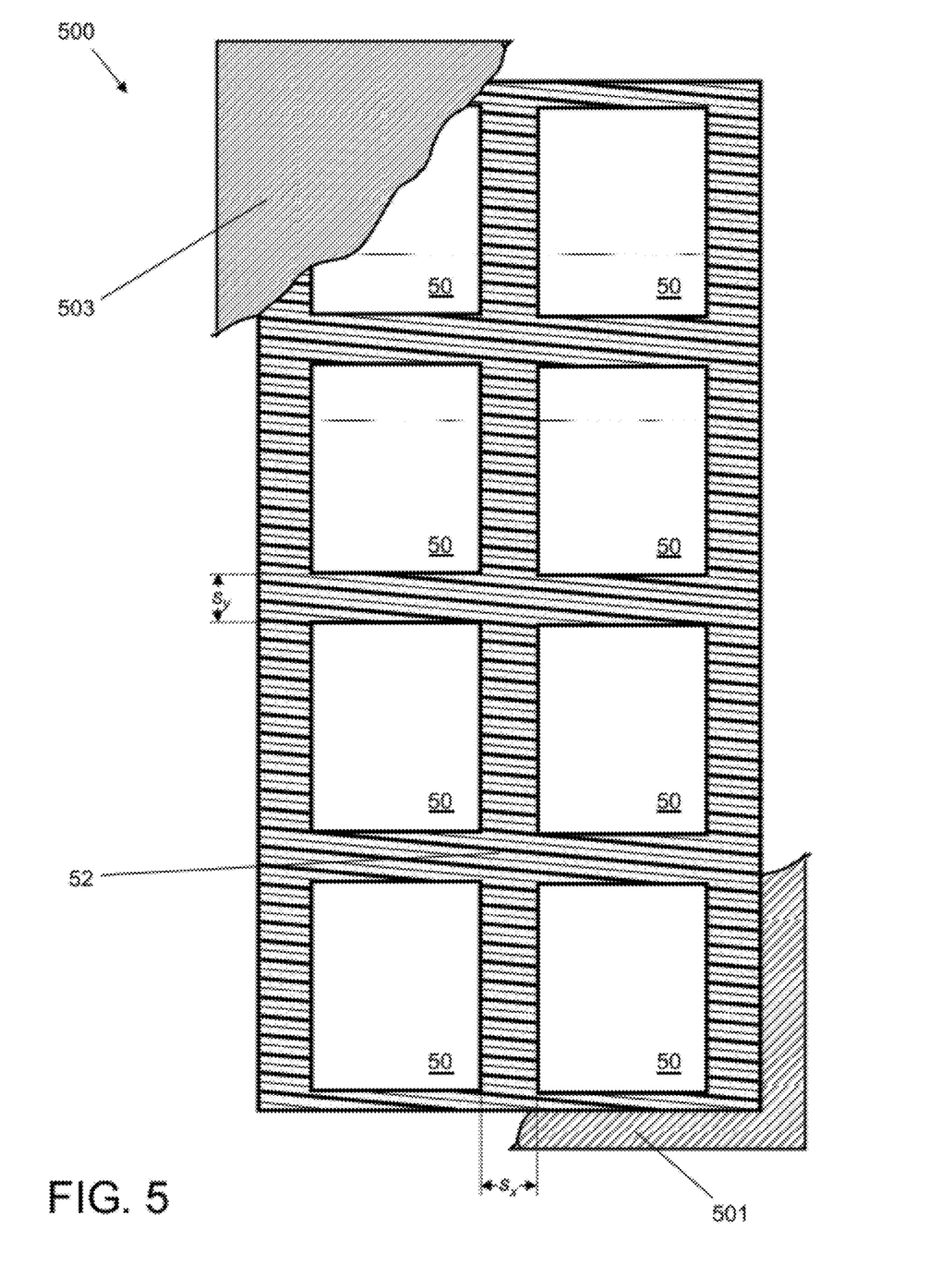
FIG. 5 is a diagrammatic front view, via superposition of layer or layer portion, of a three-layer ballistic armor system having a configuration that is generally representative of the armor systems respectively shown in FIG. 1 through FIG. 4. Test prototypes of these four different armor systems, which were characterized by equal areal densities, were used for comparative testing by the United States Navy.

Reference is now made to FIG. 1 through FIG. 5, which illustrate four different plural-layer composite ballistic armor systems 500 that are representative of the experimental versions that were compared in testing performed by the U.S. Navy. Experimental armor systems $500_1$, $500_2$, $500_3$, and $500_4$ are diagrammatically portrayed in FIG. 1, FIG. 2, FIG. 3, and FIG. 4, respectively. The armor system 500 shown in FIG. 5 is geometrically illustrative in its frontal view of any one among the armor systems $500_1$, $500_2$, $500_3$, and $500_4$.

Each composite armor system 500 includes a rigid backing layer 501, a ceramic-embedded elastic (e.g., elastomeric) matrix material layer 502, and a debris-containment layer (also referred to herein as a "spall-containment" layer or a "spall cover") 503. Backing layer 501 and spall-containment layer 503 are each composed of a rigid material—such as a fiber-reinforced polymer matrix material, or a metallic (metal or metal alloy) material (e.g., steel, titanium, aluminum)—that is appropriate to the contemplated armor application(s). The intermediate layer, viz., ceramic-embedded elastomeric matrix material layer 502, is less rigid than either the spall-containment layer 503 or the backing layer 501.

Each experimental armor system 500 includes arrayed, geometrically congruent, ceramic elements 50 that differ from the ceramic elements 50 included in the other three armor systems 500. Ceramic elements $50_1$ and ceramic elements $50_2$ are materially the same but are materially different from ceramic elements $50_3$ and ceramic elements $50_4$, which are materially different from each other. Armor system $500_1$ (shown in FIG. 1) includes ceramic elements $50_1$, which are composed of aluminosilicate porcelain. Armor system $500_2$ (shown in FIG. 2) includes ceramic elements $50_2$, which are composed of the same aluminosilicate porcelain material as are ceramic elements $50_1$. Armor system $500_3$ (shown in FIG. 3) includes ceramic elements $50_3$, which are composed of 90% alumina, which is tantamount to a high-alumina porcelain. Armor system $500_4$ (shown in FIG. 4) includes ceramic elements $50_4$, which are composed of 99% alumina.

Moreover, ceramic elements $50_1$, ceramic elements $50_2$, ceramic elements $50_3$, and ceramic elements $50_4$ all differ geometrically from one another. As elaborated on hereinbelow, each armor system 500 differs in terms of the uniform thickness of each of its ceramic elements 50 (measured from the front surface of the ceramic element 50 to the back surface of the ceramic element 50), and therefore each armor system 500 differs in terms of its own uniform thickness (measured from the front surface of spall-containment layer 503 to the back surface of backing layer 501). The uniform thicknesses of the ceramic elements 50 differ among the four armor systems 500 in accordance with the corresponding densities of the ceramic materials.

The ceramic elements 50 that are included in each composite armor system 500 are characterized by a conventional ceramic tile shape. A conventional ceramic element, commonly referred to as a ceramic "tile," has a flat right prism shape with smooth surfaces; for instance, a typical conventional ceramic element has a rectangular (either square or non-square) parallelepiped shape. All of the ceramic elements 50 within a given armor system 500 are materially identical and are geometrically congruent, having uniform plan form and uniform thickness, as depicted in FIG. 1 through FIG. 5. FIG. 5 shows, by way of example, a rectangular plan form for each ceramic element 50 in the planar array. The ceramic elements 50' depicted in FIG. 8 similarly describe a rectangular plan form. In accordance with inventive principle, the plan form of an inventive ceramic element 50 need not be rectangular, as the plan form can describe any polygonal shape (e.g., triangular or hexagonal), and can even describe an irregular or non-polygonal shape.

In each armor system 500, plural ceramic elements 50 are embedded in elastomeric matrix material 52, thereby forming a ceramic-embedded elastomeric matrix material layer 502, which is situated on backing layer 501. Ceramic-embedded elastic matrix material layer 502 is composed of an elastomeric matrix material 52 and plural ceramic elements 50, which are embedded in the elastomeric matrix material 52. Each armor system includes an elastomeric matrix material 502 that is homogeneous, i.e., entirely of the same composition. The terms "elastomer" and "elastomeric," as used herein, broadly refer to any material that is both polymeric and elastic (e.g., viscoelastic), and are considered to include both natural (e.g., natural rubber) and synthetic (e.g., thermoset or thermoplastic) materials. Frequent practice of armor system 500 employs a thermoset elastomer 52; polyurethane and polyurea are two thermoset elastomers that will often be suitable for constituting the elastomeric matrix material 52 in inventive practice, as polyurethane and polyurea are each characterized by high elongation-to-failure (high strain-to-failure).

Figure 1:
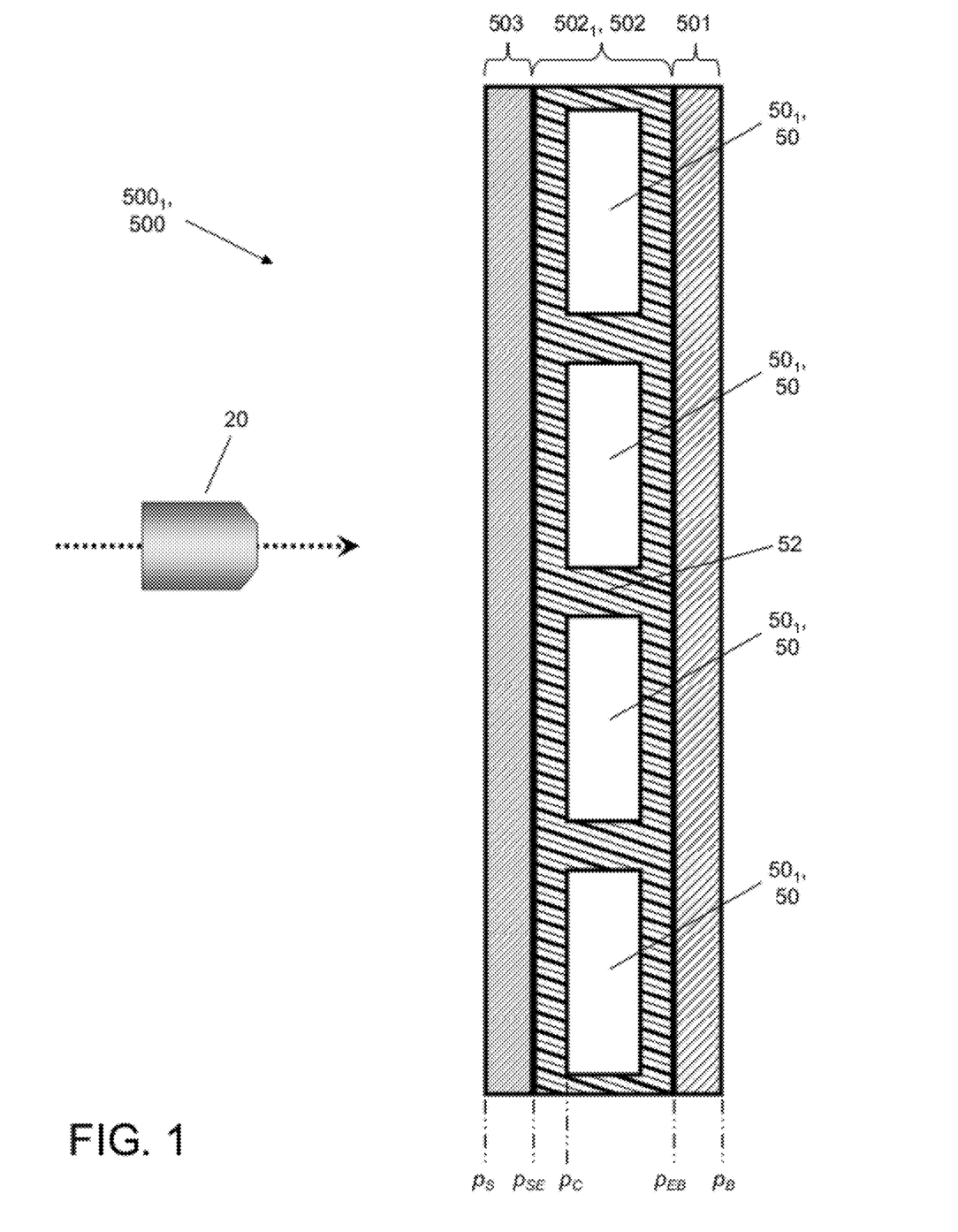
FIG. 1 is a side cross-sectional view of an embodiment of a three-layer ballistic armor system in accordance with the present invention. This inventive embodiment includes a single layer of arrayed ceramic elements made of aluminosilicate porcelain.

Ceramic elements $50_1$ (FIG. 1), $50_3$ (FIG. 3), and $50_4$ (FIG. 4) are arrayed in a single geometric plane; in contrast, ceramic elements $50_2$ (FIG. 2) are arrayed in two proximate parallel planes. For instance, as shown in FIG. 1, ceramic elements $50_1$ of armor system $500_1$ are arranged along a geometric plane $p_C$, which corresponds to the front (initial strike) surface of spall-containment layer 503. More specifically, geometric plane $p_C$ (described by the respective front faces of the ceramic elements 50), geometric plane $p_S$ (described by the front surface of spall-containment layer 503), geometric plane $p_{SE}$ (described by the back surface of spall-containment layer 503, and by the front surface of ceramic-embedded elastomeric matrix material layer 502), geometric plane $p_{EB}$ (described by the back surface of ceramic-embedded elastomeric matrix material layer 502, and by the front surface of backing layer 501), and geometric plane $p_B$ (described by the back surface of backing layer 501), are parallel to each other. As distinguished from ceramic elements $50_1$ of armor system $500_1$ (FIG. 1), ceramic elements $50_2$ of armor system $500_2$ (FIG. 2) are arrayed in two sub-arrays describing two corresponding parallel geometric planes $p_C$, viz., geometric planes $p_{Ca}$ and $p_{Cb}$, each of which is parallel to geometric planes $p_S$, $p_{SE}$, $p_{EB}$ and $p_B$.

Figure 2:
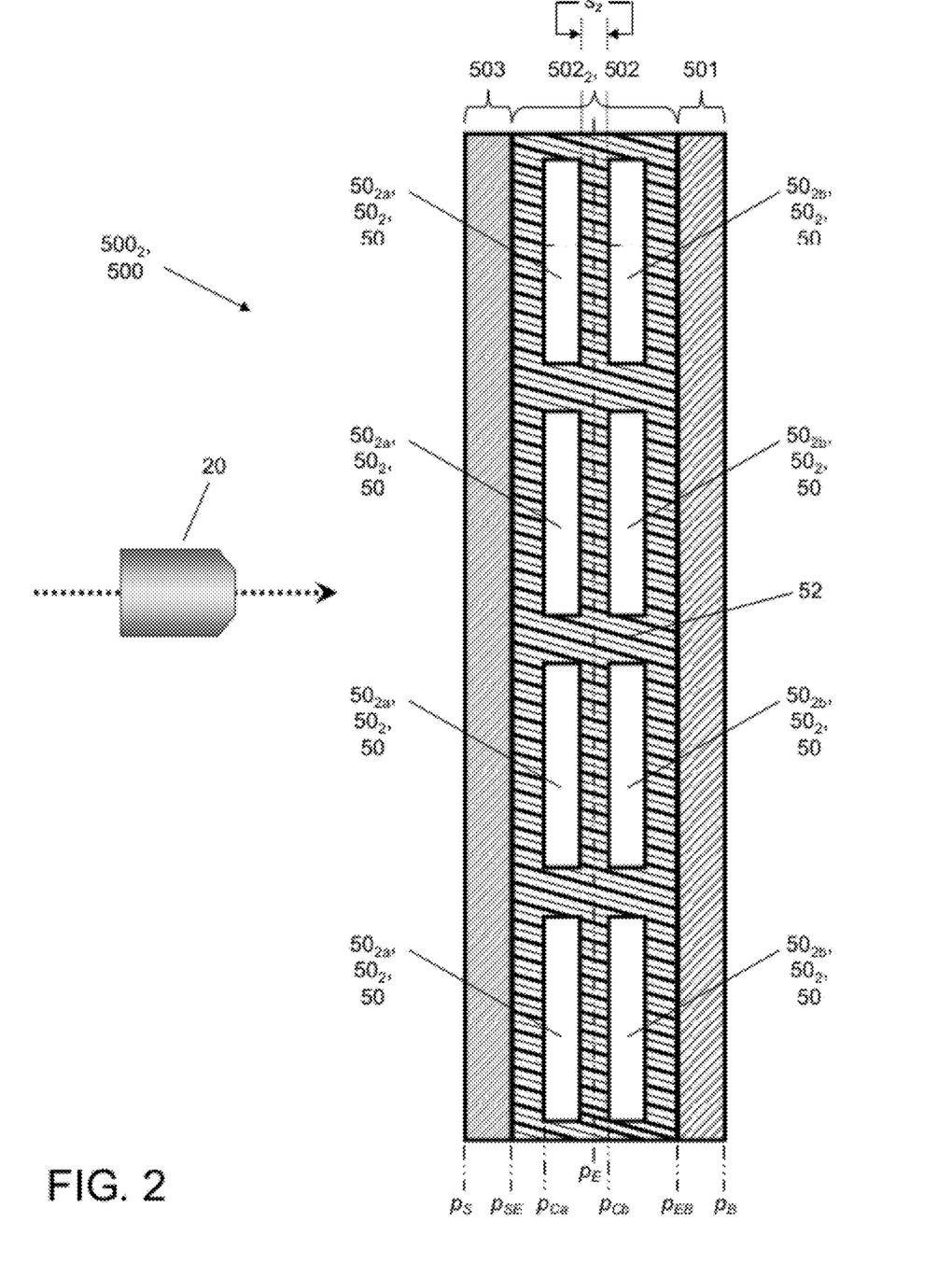
FIG. 2 is a side cross-sectional view of another embodiment of a three-layer ballistic armor system in accordance with the present invention. This inventive embodiment includes a double layer of arrayed ceramic elements made of aluminosilicate porcelain.

As shown in FIG. 1, FIG. 3 and FIG. 4, the ceramic elements 50 are arrayed in a single geometric plane and are coupled to backing layer 501. For instance, ceramic elements 50 are adhered to backing layer 501 via elastomeric matrix material 52 (and/or via a different, bonding material) so that the back faces of the ceramic elements 50 are adjacent to the front surface of backing layer 501. In contrast, as shown in FIG. 2, the ceramic elements $50_2$ are arrayed in two closely spaced parallel geometric planes $p_{Ca}$ and $p_{Cb}$, and corresponding inter-plane pairs of ceramic elements $50_2$ are adhered to each other along geometric plane $p_E$ via elastomeric matrix material 52. The ceramic elements $50_2$ of geometric planes $p_{Cb}$ in FIG. 2 are adhered to backing layer 501 similarly as the ceramic elements 50 are adhered to backing layer 501 in FIG. 1, FIG. 3 and FIG. 4.

Generally speaking, the arrayal of the ceramic elements can vary in practice of the present invention. Depending on the inventive embodiment, the ceramic elements can be arranged in one or more rows, and in one or more columns, along the common geometric plane $p_C$. Further, the ceramic elements can be arranged in one or more parallel geometric planes $p_C$, such as the one geometric plane $p_C$ shown in FIG. 1 or the two geometric planes $p_{Ca}$ and $p_{Cb}$ shown in FIG. 2.

The physical mechanisms associated with projectile impact are essentially the same for armor systems $500_1$, $500_2$, $500_3$, and $500_4$. A projectile 20 makes initial contact with a composite ballistic armor system 500 at the front (strike) surface of spall-containment layer 503. Upon subjection of a composite ballistic armor system 500 to impact by a projectile (such as projectile 20 shown in FIG. 1 through FIG. 4), the various components of the armor system 500 serve corresponding functions, as elaborated upon in the following four paragraphs.

The spall cover 503 serves to contain flying debris, e.g., fragments of the projectile 20 and/or ceramic material.

The ceramic element 50 that is contacted by the projectile 20 serves to blunt and/or break up the projectile 20. If and to the extent that the contacted ceramic element 50 fractures, it absorbs energy. If more than one ceramic element 50 is contacted by the projectile 20, each ceramic element 50 may behave similarly.

The elastomeric matrix material 52 absorbs energy and constrains the fractured ceramic element(s) 50, thereby imparting some continued, partial effectiveness of the fractured ceramic element(s). In addition, the elastomeric matrix material diffuses the shock resulting from the impact, thereby preventing the ceramic elements near the impact area from fracturing; in this manner, the elastomeric matrix material preserves the ballistic capability of neighboring ceramic material for future impacts, i.e., a "multi-hit" capability.

The backing 501 serves as a "catcher" to stop debris such as the broken pieces of the projectile and/or the ceramic material.

The elastomeric matrix material 52 affords benefits other than those associated with projectile impact such as noted hereinabove. The elastomeric matrix material can serve as an adhesive for assembly of a composite armor system 50 and, due to its placement at or toward the front thereof, can serve to protect the ceramic elements from accidental damage during service (e.g., maintenance or repair).

The coupling of the ceramic elements 50 to the backing layer 501 is generally an important aspect of practicing an armor system 500. A conventional polymeric matrix material 52 is an unadulterated elastomer such as polyurethane or polyurea or some combination thereof. The back face of a conventionally shaped ceramic element 50, though smooth, may adhere better to backing 501 if an adulterated elastomeric matrix material 52 is used, such as a filled polymeric material that incorporates metal filler particles and/or ceramic filler particles. The solid particulate quality of a filled polymeric material may enhance coupling of the ceramic elements to the backing. Such a particle-filled elastomeric matrix material would usually represent a bonding material with higher stiffness (modulus or acoustic impedance) than would an unfilled elastomeric matrix material.

Generally in inventive practice, the two essential layers of a inventive plural-layer armor system 500 are the ceramic-embedded elastic matrix material layer 502 and the backing layer 501; in addition thereto, an inventive armor system 500 can be embodied to include one or practically any plural number of additional layers or sub-layers of practically any material and configurational description, for instance metallic, fiber-reinforced polymer, or ceramic-embedded polymer. The present invention can be practiced so that armor system 500 includes a rigid backing layer 501 and a ceramic-embedded elastic matrix material 502, but does not include a spall-containment layer 503. Otherwise expressed, either two-layer inventive practice (excluding a spall cover) or three-layer inventive practice (including a spall cover) is possible. Spall-containment layer 503, which serves a purpose of containing flying debris (spall) that results from impact of a projectile upon the armor system 500, is includable or excludable in armor system 500, depending on the contemplated application(s). The spall-containment layer 503 (if included therein) serves a limited function and does not serve to significantly mitigate the force of the projectile, which for all intents and purposes strikes the ceramic-embedded elastic matrix material 52 with full force.

The terms "areal density" and "areal packing density," as used synonymously herein, denote mass per unit area, such as measured in the geometric plane of the front surface of an armor system 500. For instance, the areal density of composite armor system $500_1$, shown in FIG. 1, is the mass per unit area of armor system $500_1$ as measured in any of the geometric planes describing armor system armor system $500_1$. As illustrated in FIG. 1, parallel geometric planes $p_C$, $p_S$, $p_{SE}$, $p_{EB}$, and $p_B$ equivalently describe the areal expanse of armor system $500_1$, and the areal density can be considered to denote the mass per unit area of armor system $500_1$ as measured in any of these geometric planes.

Figure 6:
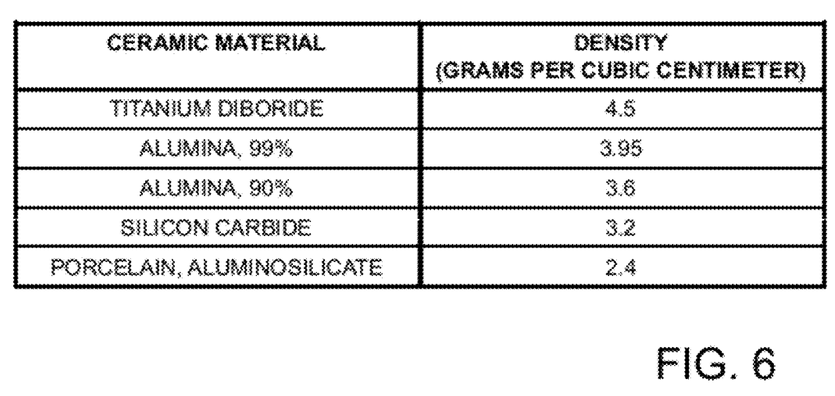
FIG. 6 is a table setting forth the densities of five ceramic materials, viz., silicon carbide, alumina 99%, alumina 90%, titanium diboride, and aluminosilicate porcelain.
Figure 7:
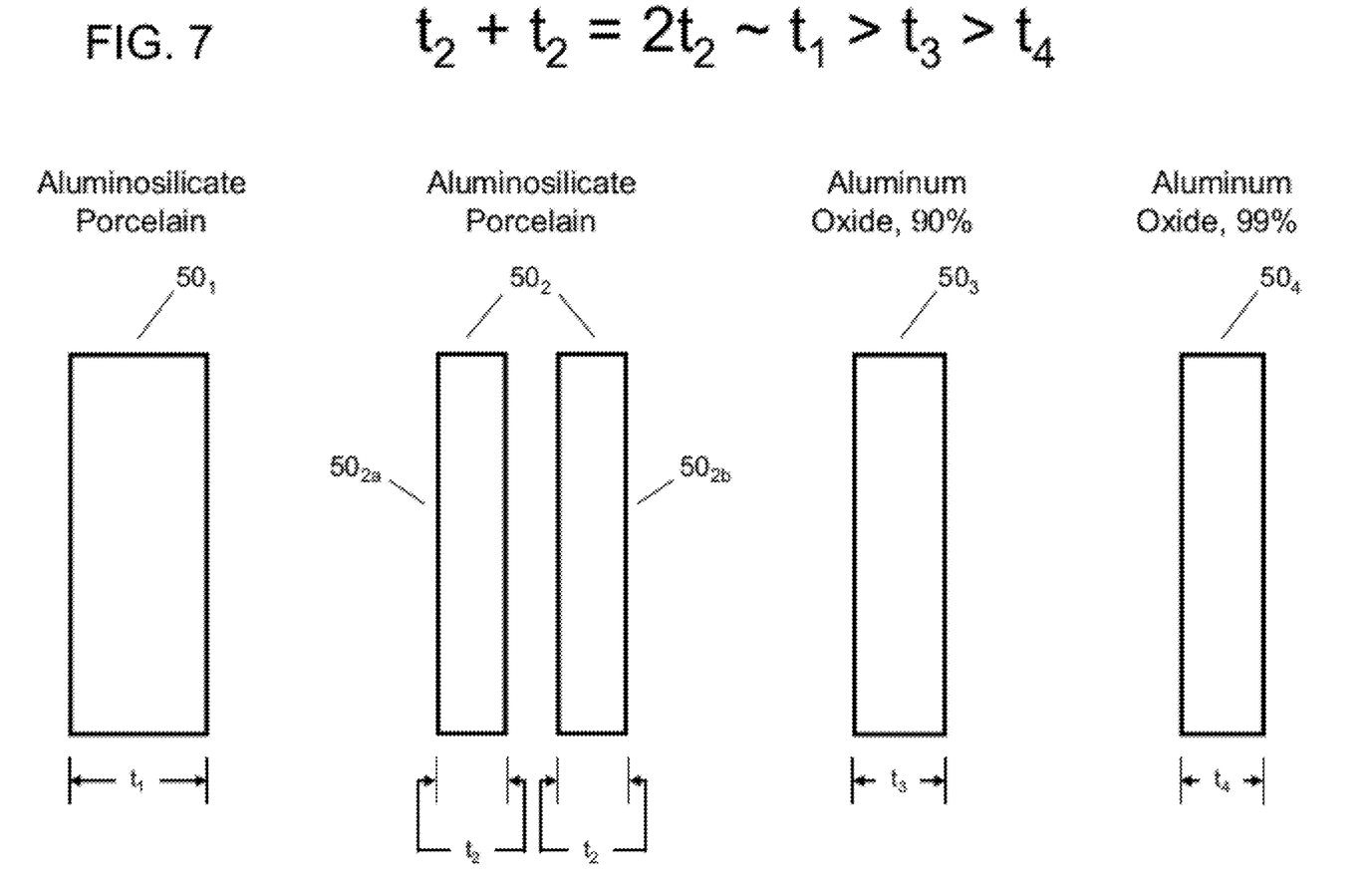
FIG. 7 is a diagram particularly illustrative of the relative thicknesses of the respective ceramic elements that were used in the four different experimental armor systems.
Figure 8:
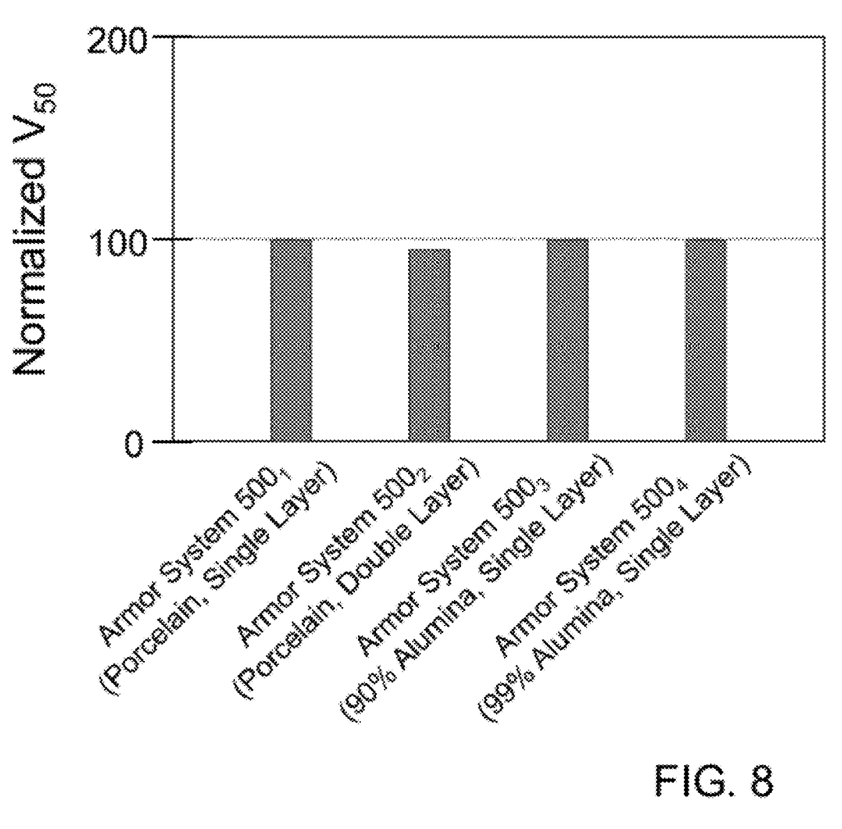
FIG. 8 is a bar graph illustrating results of the comparative testing that was conducted by the U.S. Navy.

Still referring to FIG. 1 through FIG. 5, and also referring to FIG. 6 through FIG. 8, the present inventors as U.S. Navy employees conducted the aforementioned testing to investigate the possibility of using aluminosilicate porcelain as a ceramic armor material, as an alternative to conventional ceramic armor materials. Heretofore in conventional practice the above-noted conventional pure ceramic materials (aluminum oxide, silicon carbide, boron carbide, titanium carbide, etc.) have been relied upon for armor applications. In their testing the present inventors demonstrated that aluminosilicate porcelain elements can be efficaciously implemented as embedded in an elastomeric layer of a plural-layer composite armor material system.

Use of aluminosilicate porcelain (a pure ceramic material) is not known in the armor-related arts, as low-density ceramic materials such as aluminosilicate porcelain have always been and remain dismissed as insufficiently strong ceramic materials for use in armor applications. Because they are advantageous in terms of weight, cost and availability, aluminosilicate porcelain and other low-density ceramic materials are believed by the present inventors to be worthy of consideration as alternative ceramic armor materials to the conventional ones. As indicated in FIG. 6, aluminosilicate porcelain has a density of 2.4 g/cm$^3$, significantly less than the densities of: silicon carbide (3.2 g/cm$^3$); 90% aluminum oxide (3.6 g/cm$^3$); 99% aluminum oxide (3.95 g/cm$^3$); and, titanium diboride (4.5 g/cm$^3$).

For their comparative testing, the present inventors assembled four experimental armor systems 500 similar to those that are diagrammatically depicted as armor systems $501_1$, $501_2$, $501_3$, and $501_4$ in FIG. 1, FIG. 2, FIG. 3, and FIG. 4, respectively. In each of the four experimental armor systems 500, conventionally shaped ceramic elements (rectangular flat plate ceramic "tiles") 50 were embedded in elastomeric matrix material 52. The ceramic tiles 50 and the elastomeric matrix material 52 together constituted the ceramic-embedded elastomeric matrix layer 502, which was adjacently situated between steel backing layer 501 and steel spall-containment layer 503. The steel material of the backing and spall-containment layers was a rolled homogeneous armor ("RHA"). The elastomer 52 was a polyurea that had a density of about 1.1 g/cm$^3$ and that was made using the curative Versalink® manufactured by Air Products. The aluminosilicate porcelain tiles $50_1$ and $50_2$ were manufactured by Crossville Ceramics Company.

In the first armor system (FIG. 1), aluminosilicate porcelain tiles $50_1$ were arrayed in a single geometric plane. In the second armor system (FIG. 2), aluminosilicate porcelain tiles $50_2$ were arrayed in two closely spaced geometric planes. In the third armor system (FIG. 3), 90% aluminum oxide tiles were arrayed in a single geometric plane. In the fourth armor system (FIG. 4), 99% aluminum oxide tiles were arrayed in a single geometric plane. The four experimental armor systems 500 were made so as to be characterized by equal areal densities of the respective ceramic elements 50, wherein areal density was defined as mass per unit area measured in the geometric plane (e.g., frontal geometric plane) of the armor system.

The areal densities of the experimental armor systems 500 were designed to be equal to one another. Since materially and dimensionally equivalent backings 501 and spall covers 503 were used for all four armor systems 500, the areal densities of the four disparate armor systems 500 were rendered equal by varying the respective geometric configurations of the intermediate layer, viz., the ceramic-embedded elastomeric matrix layer 503. The respective armor system designs came down to considering primarily the density of the ceramic material, and secondarily the density of the elastomeric material, the latter density being the same for all four armor systems 500.

The density of a typical elastomeric matrix material 52 used in a composite armor system 500 is considerably lower than that of even a low-density ceramic material 50 that the elastomeric matrix material 52 would encapsulate. For instance, the density of the polyurea used in the Navy's experimentation was approximately 1.1. Most elastomers that will be suitable for inventive practice will be characterized by a density in the approximate range 0.9-1.2 g/cm$^3$ Variation in the density of the ceramic-embedded layer 502 may depend primarily on the filler material, if used, rather than the elastomeric material.

The density of the first experimental armor system's aluminosilicate porcelain tiles $50_1$ equaled the density of the second armor system's aluminosilicate porcelain tiles $50_2$. This density (of the first and second experimental armor system's aluminosilicate porcelain tiles $50_1$ and $50_2$, respectively) was less than the density of the third experimental armor system's 90% alumina tiles $50_3$, which was less than the density of the fourth experimental armor system's 99% alumina tiles $50_4$. As illustrated in FIG. 7, since the four experimental armor systems 500 were designed to have equal areal densities of the respective ceramic-embedded elastomeric matrix layers 502, the thicknesses of the ceramic tiles 50 were rendered differently in accordance with the different physical densities of the ceramic tiles 50.

To elaborate, the 90% alumina tiles $50_3$ of the third armor system $500_3$ each had a thickness $t_3$, which was slightly greater than the thickness $t_4$ of each of the 99% alumina tiles $50_4$ of the fourth armor system $500_4$. In the second geometric armor system $500_2$, the aluminosilicate porcelain tiles $50_2$ each had a thickness $t_2$; however, since tiles $50_2$ were arrayed in two parallel geometric planes, the double tile $50_2$ thickness $2t_2$, which was twice the individual tile $50_2$ thickness $t_2$, was considered the germane measurement for tile thickness comparison purposes; in other words, the double tile $50_2$ thickness $2t_2$ could be thought of as equaling the combined thicknesses of a geometric planes $p_{Ca}$ tile $50_2a$ and the adjacent geometric plane $p_{Cb}$ tile $50_{2b}$. The double tile $50_2$ thickness $2t_2$ in the second experimental armor system $500_1$ was equal (or approximately equal) to the thickness $t_1$ of an individual tile $50_1$ in the first experimental armor system $500_1$. The aluminosilicate porcelain tile $50_1$ thickness $t_1$ and the aluminosilicate porcelain double tile $50_2$ thickness $2t_2$ were each significantly greater than the 90% alumina tile $50_3$ thickness $t_3$.

As illustrated in FIG. 1 through FIG. 4, the thickness of the ceramic-embedded elastomeric matrix layer 502 varied in accordance with the thickness of the ceramic elements 50 contained therein. Elastomeric matrix layer $502_3$ (FIG. 3) was thicker than elastomeric matrix layer $502_4$ (FIG. 4). Elastomeric matrix layer $502_1$ (FIG. 1) and elastomeric matrix layer $502_2$ (FIG. 2) were each thicker than elastomeric matrix layer $502_3$ (FIG. 3). Elastomeric matrix layer $502_2$ (FIG. 2) was slightly thicker than elastomeric matrix layer $502_1$ (FIG. 1) because of the slight separation, along geometric plane $p_E$, between the geometric planes $p_{Ca}$ tiles $50_{2a}$ and the geometric plane $p_{Cb}$ tiles $50_{2a}$. The total thicknesses of the armor systems 500 themselves commensurately varied at well, since dimensionally equivalent backing layers 501 and spall-containment layers 503 were used for the four armor systems 500.

The four experimental armor systems 500 were individually tested under identical circumstances in a ballistic range using a 20 millimeter fragment-simulating projectile (FSP), such as projectile 20 portrayed in FIG. 1 through FIG. 4. The ballistic performances of the four armor systems were tested and compared in terms of "$V_{50}$," which was defined as the velocity at which 50% of the projectiles 20 impacting an armor system 500 at its frontal side will be stopped by the armor system 500. As shown in FIG. 8, Velocity $V_{50}$ was normalized to a maximum value of one hundred. In real-world inventive armor applications the projectile threats may take any of a variety of forms, including but not limited to fragmentation projectiles or firearm projectiles (such as bullet 20 generically depicted in FIG. 10).

This Navy testing revealed equal or nearly equal levels of projectile-resistant effectiveness among the four experimental armor systems $500_1$, $500_2$, $500_3$, and $500_4$. It was experimentally demonstrated that the first armor system $500_1$ and the second armor system $500_2$ (i.e., the two armor systems implementing aluminosilicate porcelain tiles) exhibited performances comparable to those of the third armor system $500_3$ and the fourth armor system $500_4$ (i.e., the two armor systems implementing alumina tiles). The first ($500_1$), third ($500_3$) and fourth ($500_4$) armor systems obtained respective Velocity $V_{50}$ scores of approximately 100. The second armor system ($500_2$) obtained a Velocity $V_{50}$ score of approximately 95. The second armor system $500_2$ (which had a double-plane aluminosilicate porcelain tile arrangement in its intermediate layer $502_2$) and the first armor system $500_1$ (which had a single-plane aluminosilicate porcelain tile arrangement in its intermediate layer $502_1$), configurationally different from each other, were not equal but were comparable in their respective performances.

This experimentation supports the conclusion that lower-density ceramic material can be used in these kinds of armor systems, with effectiveness equal or nearly equal to that of conventional ceramic materials, by providing a thicker overall ceramic-embedded matrix layer having the same areal density. Within a ceramic-embedded matrix layer 502, the density of the ceramic element 50 material is much greater than the density of the elastomeric material 52. Furthermore, the difference in mass (or weight) is relatively small between an elastomer 52 of a thicker ceramic-embedded matrix layer 502 and the same elastomer 52 of a thinner ceramic-embedded matrix layer 502. For these reasons, the present invention is typically practiced so as to relegate the focus of the areal density to that of just the ceramic element 50 material.

The present inventors have thus demonstrated the efficacy of creating an analogue (e.g., variant) of a reference armor system by substituting low-density ceramic elements for conventional ceramic elements so as to duplicate the areal pattern of the conventional ceramic elements, but so as to increase the thicknesses of the low-density ceramic elements so that the low-density ceramic elements of the analogue armor system equate, in areal density, to the conventional ceramic elements of the reference armor system. The term "areal pattern" is used herein, in association with inventive practice, to denote the configuration described by an array of ceramic elements in the geometric plane of the front surfaces of the ceramic elements.

As illustrated in FIG. 5, armor systems $501_1$, $501_2$, $501_3$, and $501_4$ are characterized by the "same" areal pattern. This areal pattern common to all four armor systems 500 is described: in armor system $501_1$ by ceramic elements $50_1$; in armor system $501_3$ by ceramic elements $50_3$; in armor system $501_4$ by ceramic elements $50_4$; in armor system $501_2$ by ceramic elements $50_{2a}$; and, in armor system $501_2$ by ceramic elements $50_{2b}$. What is meant herein, in stating that all four armor systems 5000 are characterized by the "same areal pattern," is that all four armor systems 500 are characterized by geometrically congruent areal patterns, not merely that all four armor systems 500 are characterized by geometrically similar areal patterns.

FIG. 1 through FIG. 8 illustrate the inventive principle that two ceramic element arrays that are identical in both (a) areal pattern and (b) area density, but are different in (c) thickness—one array being of thicker, lower-density ceramic elements, and the other array being of thinner, higher-density ceramic elements—can afford comparable performance. As experimentally demonstrated, the increased thickness of the aluminosilicate porcelain ceramic-embedded matrix layer compensates for the lesser intrinsic ballistic armor effectiveness of aluminosilicate porcelain material as compared with conventional armor ceramic materials.

Furthermore, the notions of the ceramic material's "areal density" and the ceramic material's "weight" are equivalent in this inventive context; that is, two ceramic element arrays that are the same in both areal pattern of the ceramic material and areal density of the ceramic material will necessarily have the same mass (or weight) of the ceramic material, and two ceramic element arrays that are the same in both areal pattern of the ceramic material and mass (or weight) of the ceramic material will necessarily have the same areal density of the ceramic material. Accordingly, the afore-stated inventive principle is equivalently stated to be that two ceramic element arrays that are identical in both (a) areal pattern and (b) mass (or weight), but are different in (c) thickness—one array being of thicker, lower-density ceramic elements, and the other array being of thinner, higher-density ceramic elements—can afford comparable performance.

The above-stated inventive concepts can be extended, from experimentally supported cases in which the analogue armor system and the reference armor system have the same areal pattern, to extrapolative cases in which the analogue armor system and the reference armor system have different areal patterns. A more general proposition, reasonably inferred from the experimental data, is that equivalent or near-equivalent ballistic performance can be obtained by providing an analogue armor system (which includes low-density ceramic material) that parallels a reference armor system (which includes conventional ceramic armor material) in all basic respects except the following:

The analogue armor system includes a greater amount of low-density ceramic material so that the low-density ceramic material and the conventional ceramic armor material are characterized by the same areal density in the respective armor systems. Thus, an armor system that includes an array of lower-density ceramic material can perform as well as a similar armor system that includes a similar array of higher-density ceramic material, provided that these two arrays are characterized by equal areal densities, and regardless of whether they equate or differ in their respective areal patterns.

As compared with an armor system having high-density ceramic elements, an armor system having low-density ceramic elements according to inventive practice will tend to have a greater volume fraction of the low-density ceramic material in the ceramic-embedded elastomeric matrix layer, due to a greater volume of the low-density ceramic material in the ceramic-embedded elastomeric matrix layer. The amount of ceramic material in an armor system 500 can be expressed as a proportion of a total volume of the armor system's ceramic-embedded elastomeric matrix material layer 502. The present invention's armor system, as usually embodied, includes a ceramic-embedded elastomeric matrix material layer 502 in which the ratio of the volume of the low-density ceramic material 50 to the volume of the elastomeric material 52 is in the range between about three and about twenty; that is, the low-density ceramic material fraction of the overall volume of the ceramic-embedded elastomeric matrix material layer is usually in the approximate range 75%-95%. According to more typical inventive practice, the low-density ceramic material fraction of the overall volume of the ceramic-embedded elastomeric matrix material layer is in the approximate range 80%-95%—often in the approximate range 85%-95%, sometimes in the approximate range 90%-95%. These values are to be generally contrasted with the typical ratio of the volume of the high-density ceramic material 50 to the volume of the elastomeric material 52 in the ceramic-embedded elastomeric matrix material layer 502 of a conventional armor system, which is, roughly speaking, in the range between about one and about five; that is, in a typical conventional armor system the high-density ceramic material fraction of the overall volume of the ceramic-embedded elastomeric matrix material layer is in the approximate range 50%-85%.

Design of a lighter-density ceramic armor system analogue so as to have the same areal pattern but a greater ceramic element thickness, such as illustrated by FIG. 1 through FIG. 8, is one of several design choices in accordance with the present invention. Still with reference to FIG. 1 through FIG. 8, and also with reference to FIG. 9, parameters other than ceramic element thickness can be selected by an inventive practitioner. These other parameters include the in-plane sizes (dimensions) of the ceramic elements, the in-plane separation distances between the ceramic elements, and the through-plane separation distances between the ceramic elements. By "in-plane" is meant in this usage in a direction along a geometric plane (e.g., geometric plane $p_c$). By "through-plane" is meant in this usage in a direction perpendicular to a geometric plane (e.g., geometric plane $p_c$).

Each ceramic element has three dimensions, viz., the two in-plane dimensions of length and width and the through-plane dimension of thickness. Further, each ceramic element is separated: in the in-plane "x" (e.g., lengthwise) direction, by a distance $s_x$ from each of at least one other ceramic element; in the in-plane "y" (e.g., widthwise) direction, which is perpendicular to the in-plane "x" direction, by a distance $s_y$ from each of at least one other ceramic element; if the array is in plural parallel geometric planes, in the through-plane "z" (e.g., depth-wise) direction, by a distance $s_z$ from each of at least one other ceramic element in at least one other parallel geometric plane.

The present invention thus provides for variation in the dimensions of the individual ceramic elements, and/or in the configuration (distances between ceramic elements, orientations between ceramic elements, etc.) of the array of the ceramic elements, in order to design or construct an armor system having low-density ceramic material that emulates an armor system having conventional ceramic armor material. More specifically, typical inventive practice provides for variation of at least one, or any combination of at least two, of ceramic element array parameters including the following: ceramic element lengths (in-plane "x" dimension); ceramic element widths (in-plane "y" dimension); ceramic element thicknesses (through-plane "z" dimension); separations between adjacent pairs of ceramic elements in the in-plane "x" direction; separations between adjacent pairs of ceramic elements in the in-plane "y" direction; separations between adjacent pairs of ceramic elements in the through-plane "z" direction.

Figure 9:
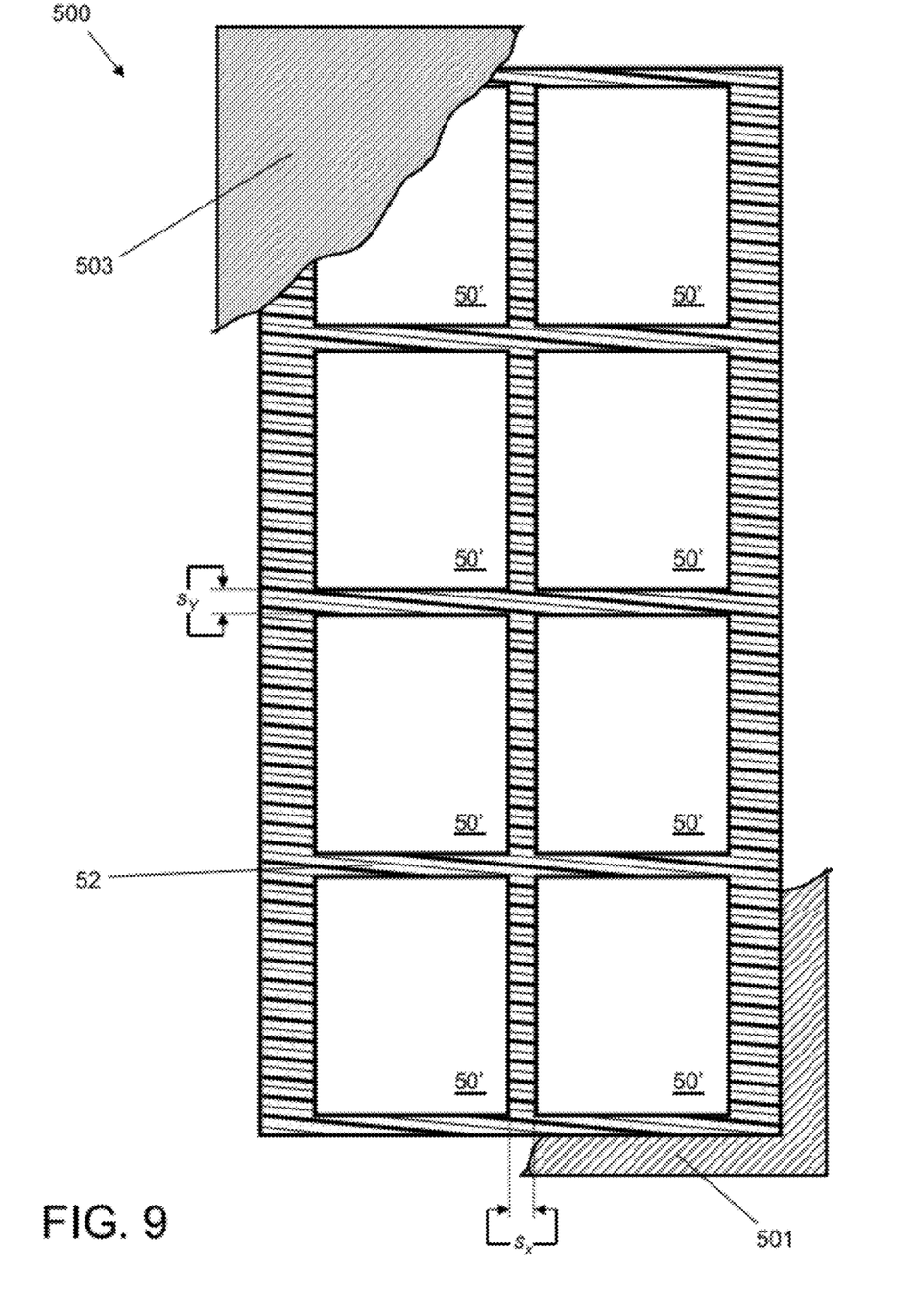
FIG. 9 is a diagrammatic front view, similar to the view shown in FIG. 5, of a three-layer ballistic armor system characterized by closer (smaller) areal separations between ceramic elements than those shown in FIG. 5.

Ceramic elements 50 (FIG. 5) and ceramic elements 50' (FIG. 9) both have a conventional ceramic armor element shape, viz., smooth, flat parallelepiped. As illustrated in FIG. 9, tight packing of ceramic elements 50 is made possible by their geometric rectangularity and congruency. Ceramic elements 50 are shown in FIG. 5 to be spaced somewhat apart, in contrast to ceramic elements 50', which are shown in FIG. 9 to be more tightly "packed" together, e.g., more closely or contiguously arranged. As compared with the array of FIG. 5, the in-plane gaps (separations) $s_x$ and $s_y$ between the ceramic elements are reduced in the array of FIG. 9. FIG. 9 can be conceived to represent smaller in-plane separations between ceramic elements 50' that have the same in-plane shape, and that have the same, or larger, or smaller in-plane sizes, as compared with the ceramic elements 50 shown in FIG. 5.

As a general rule, a ceramic material is denser than an elastomeric material; therefore, the smaller are the gaps between the ceramic elements, the greater is the areal density (synonymously, "areal packing density") of the armor system that includes those ceramic elements. The ceramic elements 50' of FIG. 9 approach minimization of the gaps $s_x$ and $s_y$ therebetween, thereby approaching maximization of the areal density of the armor system 500'. The drawings herein portraying various composite armor systems 500—viz., FIG. 1 through FIG. 5 and FIG. 9—are diagrammatic and illustrative in nature, and are not intended to suggest preferences as to numbers, dimensions, or spatial relationships of or between ceramic elements.

The ceramic elements are disclosed herein, by way of example, as being conventionally shaped, i.e., as being smooth, flat parallelepipeds. Inventive principles are also applicable to unconventional shapes of ceramic elements. For instance, the instant application bears some relation to the U.S. nonprovisional patent application being filed concurrently herewith and incorporated herein by reference for the invention entitled "Composite Ballistic Armor Having Geometric Ceramic Elements for Shock Wave Attenuation," joint inventors Curtis A. Martin, Gilbert F. Lee, and Jeffry J. Fedderly. This related application of Curtis A. Martin, Gilbert F. Lee, and Jeffry J. Fedderly discloses, inter alia, novel geometric shapes of ceramic-inclusive elements. The present invention can be practiced using ceramic elements characterized by geometric shapes in accordance with the teachings of Curtis A. Martin, Gilbert F. Lee, and Jeffry J. Fedderly.

Figure 10:
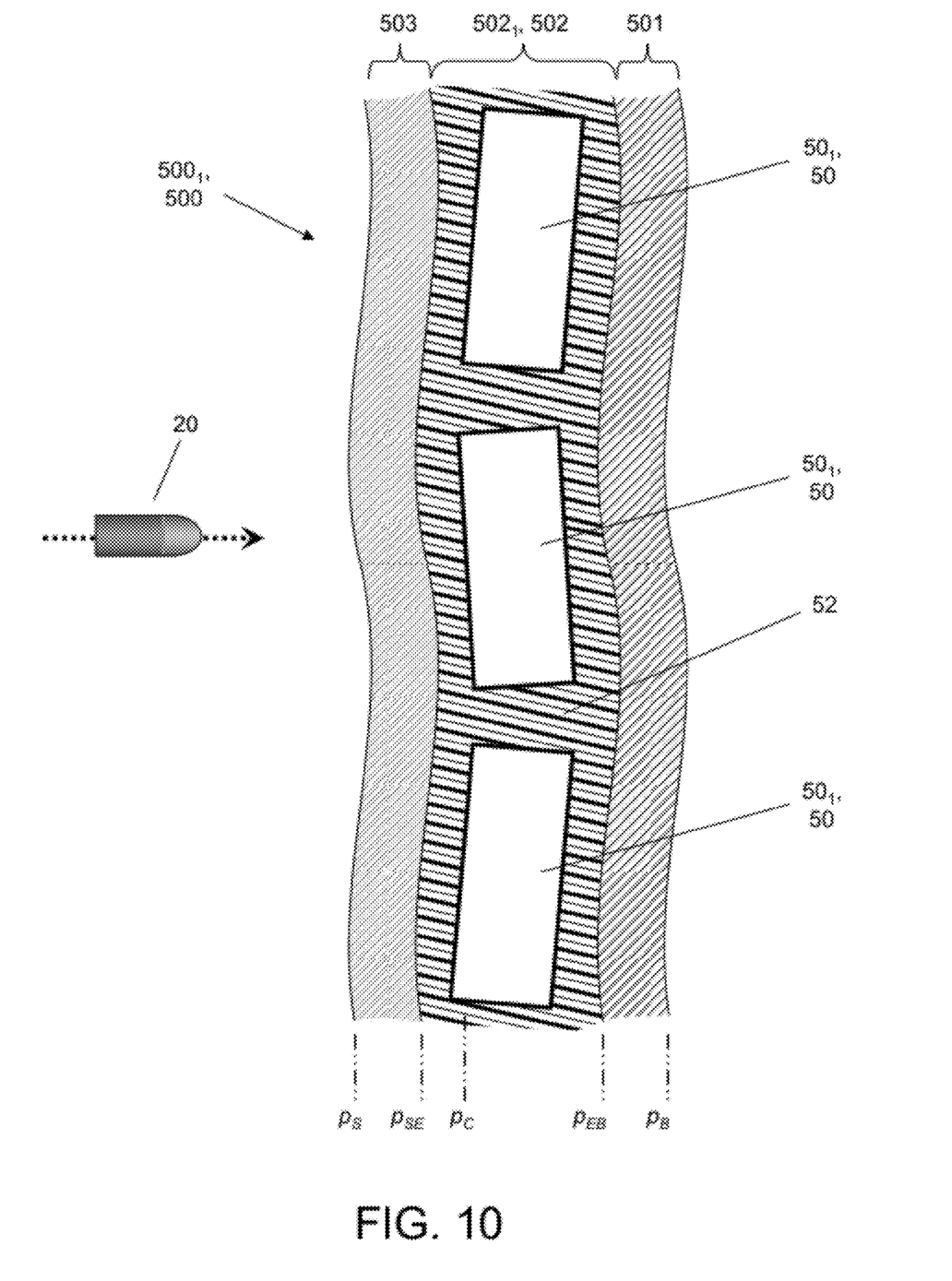
FIG. 10 is a side cross-sectional view of another embodiment of a three-layer ballistic armor system in accordance with the present invention. This inventive embodiment is characterized by curvature for conformally coupling with an object characterized by curvature.

Inventive plural-layer armor systems are not necessarily embodied so as to have an entirely linear (straight) character, such as illustrated in FIG. 1 and FIG. 2. Inventive practice encompasses inventive plural-layer armor systems that are partially or entirely curved in order to fit the contour or curvature of an entity such as a land vehicle or a ship. Now referring to FIG. 10, inventive plural-layer armor systems can be embodied so as to have a curved or curvilinear character in one direction or plural directions or all directions. FIG. 10 is intended to be illustrative of curvature of an inventive armor system $500_1$, but is not intended to suggest any particular application thereof. Similarly as exhibited by the straight layer surface-interface geometric planes shown in FIG. 1 and FIG. 2, the curved layer surface/interface geometric planes shown in FIG. 10 are parallel to each other.

As illustrated in FIG. 10, curved geometric plane $p_C$ (described by the respective front faces of the ceramic elements $50_1$), curved geometric plane $p_S$ (described by the front surface of spall-containment layer $502_1$), curved geometric plane $p_{SE}$ (described by the back surface of spall-containment layer 1003, and by the front surface of ceramic-embedded elastomeric matrix material layer $502_1$), curved geometric plane $p_{EB}$ (described by the back surface of ceramic-embedded elastomeric matrix material layer $502_1$, and by the front surface of backing layer 501), and curved geometric plane $p_B$ (described by the back surface of backing layer 501), are parallel to each other. Curved geometric plane $p_C$ is described in an approximateive manner by the front faces of the ceramic elements $50_1$. The straight front faces of ceramic elements $50_1$ tend to be parallel to the straight geometric tangents of the corresponding curved portions of the other curved geometric planes, e.g., curved geometric plane $p_{SE}$.

The term "geometric plane," as used herein specifically to indicate geometries relating to armor system layering (e.g., surfaces or interfaces of layers) or ceramic-inclusive element arrayal (e.g., front points or front surfaces of ceramic elements of an array) in the context of inventive practice of plural-layer armor systems, broadly refers to a geometric plane that is straight in all directions or that is at least partially curved in at least one direction. Otherwise expressed, a "geometric plane," in this specialized usage of the term, can be characterized by complete linearity, or by some degree of linearity and some degree of curvilinearity, or by complete curvilinearity. Regardless of the degree of curvature, if any, of an inventive armor system, its system layering and ceramic-inclusive element arrayal are configured so as to generally manifest parallelness, which can be expressed in terms of corresponding geometric planes.

The present invention, which is disclosed herein, is not to be limited by the embodiments described or illustrated herein, which are given by way of example and not of limitation. Other embodiments of the present invention will be apparent to those skilled in the art from a consideration of the instant disclosure or from practice of the present invention. Various omissions, modifications and changes to the principles disclosed herein may be made by one skilled in the art without departing from the true scope and spirit of the present invention, which is indicated by the following claims.

What is claimed is:

1. A method for designing a plural-layer composite armor system, the method comprising:
   selecting a reference armor system, said reference armor system comprising a reference ceramic-material-embedded elastomeric matrix material layer and a reference backing layer, said reference ceramic-material-embedded elastomeric matrix material layer including elastomeric matrix material and plural reference ceramic elements embedded in said elastomeric matrix material, each said reference ceramic element being composed of ceramic material characterized by a reference material density, said reference ceramic elements being arrayed along a reference geometric plane and being characterized by a reference areal density with respect to said reference geometric plane, said reference geometric plane corresponding to said reference ceramic-material-embedded elastomeric matrix material layer;
   modeling an analogue armor system, said analogue armor system being analogous to said reference armor system, said analogue armor system comprising an analogue ceramic-material-embedded elastomeric matrix material layer and an analogue backing layer, said analogue ceramic-material-embedded elastomeric matrix material layer including elastomeric matrix material and plural analogue ceramic elements embedded in said elastomeric matrix material, each said analogue ceramic element being composed of ceramic material characterized by an analogue material density that differs from said reference material density, said analogue ceramic elements being arrayed along an analogue geometric plane and being characterized by an analogue areal density with respect to said geometric plane, said analogue geometric plane corresponding to said analogue ceramic-material-embedded elastomeric matrix material layer, said modeling including determining and recording at least one variation in the configuration of said analogue ceramic elements versus the configuration of said reference ceramic elements, wherein said variation is associated with equality of said analogue areal density and said reference areal density.

2. The method for designing of claim 1 wherein said at least one variation is at least one of:
   the sizes of said analogue ceramic elements versus the sizes of said reference ceramic elements;
   the distances between said analogue ceramic elements versus the distances between said reference ceramic elements.

3. The method for designing of claim 1 wherein:
   said at least one variation involves a difference in the proportion of the volume of said analogue ceramic elements relative to the volume of said analogue ceramic-material-embedded elastomeric matrix material layer, versus the proportion of the volume of said reference ceramic elements relative to the volume of said reference ceramic-material-embedded elastomeric matrix material layer;
   each said reference ceramic element is composed of a ceramic material selected from the group consisting of aluminum oxide, silicon carbide, boron carbide, and titanium carbide;
   each said analogue ceramic element is composed of aluminosilicate porcelain.

4. The method for designing of claim 1 wherein said analogue material density is less than said reference material density, and wherein said at least one variation involves an increase in the proportion of the volume of said analogue ceramic elements relative to the volume of said analogue ceramic-material-embedded elastomeric matrix material layer, versus the proportion of the volume of said reference ceramic elements relative to the volume of said reference ceramic-material-embedded elastomeric matrix material layer.

5. The method for designing of claim 1 wherein:
said reference ceramic elements are characterized by a reference element thickness and by a reference areal pattern with respect to said reference geometric plane;
said analogue ceramic elements are characterized by an analogue element thickness and by an analogue areal pattern with respect to said analogue geometric plane;
said analogue areal pattern is identical to said reference areal pattern;
said analogue material density is less than said reference material density;
said at least one variation includes an increase in said analogue element thickness versus said reference element thickness;
said increase in said analogue element thickness versus said reference element thickness is concomitant an increase in the proportion of the volume of said analogue ceramic elements relative to the volume of said analogue ceramic-material-embedded elastomeric matrix material layer, versus the proportion of the volume of said reference ceramic elements relative to the volume of said reference ceramic-material-embedded elastomeric matrix material layer.

6. The method for designing of claim 1 wherein:
said reference ceramic elements are characterized by a reference rectangular parallelepiped shape, a reference in-plane length, a reference in-plane width, a reference through-plane thickness, and a reference areal pattern with respect to said reference geometric plane;
said analogue ceramic elements are characterized by an analogue rectangular parallelepiped element shape, an analogue in-plane element length, an analogue in-plane element width, an analogue through-plane element thickness, and an analogue areal pattern with respect to said analogue geometric plane;
said analogue in-plane element length is equal to said reference in-plane element length;
said analogue in-plane element width is equal to said reference in-plane element width;
said analogue areal pattern is identical to said reference areal pattern;
said analogue material density is less than said reference material density;
said at least one variation includes an increase in said analogue through-plane element thickness versus said reference through-plane element thickness.

7. A method for making a plural-layer composite armor system, the method comprising:
selecting a reference armor system, said reference armor system comprising a reference ceramic-material-embedded elastomeric matrix material layer and a reference backing layer, said reference ceramic-material-embedded elastomeric matrix material layer including elastomeric matrix material and plural reference ceramic elements embedded in said elastomeric matrix material, each said reference ceramic element being composed of ceramic material characterized by a reference material density, said reference ceramic elements being arrayed along a reference geometric plane and being characterized by a reference areal density with respect to said reference geometric plane, said reference geometric plane corresponding to said reference ceramic-material-embedded elastomeric matrix material layer;
modeling an analogue armor system, said analogue armor system being analogous to said reference armor system, said analogue armor system comprising an analogue ceramic-material-embedded elastomeric matrix material layer and an analogue backing layer, said analogue ceramic-material-embedded elastomeric matrix material layer including elastomeric matrix material and plural analogue ceramic elements embedded in said elastomeric matrix material, each said analogue ceramic element being composed of ceramic material characterized by an analogue material density that differs from said reference material density, said analogue ceramic elements being arrayed along an analogue geometric plane and being characterized by an analogue areal density with respect to said geometric plane, said analogue geometric plane corresponding to said analogue ceramic-material-embedded elastomeric matrix material layer, said modeling including determining and recording at least one variation in the configuration of said analogue ceramic elements versus the configuration of said reference ceramic elements, wherein said variation is associated with equality of said analogue areal density and said reference areal density; and
making an analogue armor system in accordance with said modeling of said analogue armor system.

8. The method for making a plural-layer composite armor system of claim 7 wherein said at least one variation is at least one of:
the sizes of said analogue ceramic elements versus the sizes of said reference ceramic elements;
the distances between said analogue ceramic elements versus the distances between said reference ceramic elements.

9. The method for making a plural-layer composite armor system of claim 7 wherein said at least one variation involves a difference in the proportion of the volume of said analogue ceramic elements relative to the volume of said analogue ceramic-material-embedded elastomeric matrix material layer, versus the proportion of the volume of said reference ceramic elements relative to the volume of said reference ceramic-material-embedded elastomeric matrix material layer.

10. The method for making a plural-layer composite armor system of claim 7 wherein:
each said reference ceramic element is composed of a ceramic material selected from the group consisting of aluminum oxide, silicon carbide, boron carbide, and titanium carbide;
each said analogue ceramic element is composed of aluminosilicate porcelain.

11. The method for making a plural-layer composite armor system of claim 7 wherein said analogue material density is less than said reference material density, and wherein said at least one variation involves an increase in the proportion of the volume of said analogue ceramic elements relative to the volume of said analogue ceramic-material-embedded elastomeric matrix material layer, versus the proportion of the volume of said reference ceramic elements relative to the volume of said reference ceramic-material-embedded elastomeric matrix material layer.

12. The method for making a plural-layer composite armor system of claim 11 wherein said at least one variation is at least one of:
the sizes of said analogue ceramic elements versus the sizes of said reference ceramic elements;
the distances between said analogue ceramic elements versus the distances between said reference ceramic elements.

13. The method for making a plural-layer composite armor system of claim 11 wherein:

each said reference ceramic element is composed of a ceramic material selected from the group consisting of aluminum oxide, silicon carbide, boron carbide, and titanium carbide;

each said analogue ceramic element is composed of aluminosilicate porcelain.

14. The method for making a plural-layer composite armor system of claim 7 wherein:

said reference ceramic elements are characterized by a reference element thickness and by a reference areal pattern with respect to said reference geometric plane;

said analogue ceramic elements are characterized by an analogue element thickness and by an analogue areal pattern with respect to said analogue geometric plane;

said analogue areal pattern is identical to said reference areal pattern;

said analogue material density is less than said reference material density;

said at least one variation includes an increase in said analogue element thickness versus said reference element thickness.

15. The method for making a plural-layer composite armor system of claim 14 wherein said increase in said analogue element thickness versus said reference element thickness is concomitant an increase in the proportion of the volume of said analogue ceramic elements relative to the volume of said analogue ceramic-material-embedded elastomeric matrix material layer, versus the proportion of the volume of said reference ceramic elements relative to the volume of said reference ceramic-material-embedded elastomeric matrix material layer.

16. The method for making a plural-layer composite armor system of claim 14 wherein said at least one variation is at least one of:

the sizes of said analogue ceramic elements versus the sizes of said reference ceramic elements;

the distances between said analogue ceramic elements versus the distances between said reference ceramic elements.

17. The method for making a plural-layer composite armor system of claim 14 wherein:

each said reference ceramic element is composed of a ceramic material selected from the group consisting of aluminum oxide, silicon carbide, boron carbide, and titanium carbide;

each said analogue ceramic element is composed of aluminosilicate porcelain.

18. The method for making a plural-layer composite armor system of claim 7 wherein:

said reference ceramic elements are characterized by a reference rectangular parallelepiped shape, a reference in-plane length, a reference in-plane width, a reference through-plane thickness, and a reference areal pattern with respect to said reference geometric plane;

said analogue ceramic elements are characterized by an analogue rectangular parallelepiped element shape, an analogue in-plane element length, an analogue in-plane element width, an analogue through-plane element thickness, and an analogue areal pattern with respect to said analogue geometric plane;

said analogue in-plane element length is equal to said reference in-plane element length;

said analogue in-plane element width is equal to said reference in-plane element width;

said analogue areal pattern is identical to said reference areal pattern;

said analogue material density is less than said reference material density;

said at least one variation includes an increase in said analogue through-plane element thickness versus said reference through-plane element thickness.

19. The method for making a plural-layer composite armor system of claim 18 wherein said reference material density is greater than approximately three grams per cubic centimeter, and wherein said analogue material density is less than or equal to approximately three grams per cubic centimeter.

20. The method for making a plural-layer composite armor system of claim 7 wherein said reference material density is greater than approximately three grams per cubic centimeter, and wherein said analogue material density is less than or equal to approximately three grams per cubic centimeter.

\* \* \* \* \*